United States Patent [19]

Button et al.

[11] 3,870,908

[45] Mar. 11, 1975

[54] BELL HOUSINGS FOR MOUNTING ELECTRIC MOTORS

[75] Inventors: David Button, West Suffolk; Philip Ward Hopkins, Norfolk, both of England

[73] Assignee: U.C.C. International Limited, Thetford, Norfolk, England

[22] Filed: Dec. 17, 1973

[21] Appl. No.: 425,634

[30] Foreign Application Priority Data
Jan. 12, 1973   Great Britain ................... 1725/73

[52] U.S. Cl. ..................... 310/91, 248/2, 310/89
[51] Int. Cl. ............................................ H02k 5/00
[58] Field of Search ............ 310/91, 85, 51, 88, 89; 248/2, 15, 16, 26

[56] References Cited
UNITED STATES PATENTS

| | | | |
|---|---|---|---|
| 1,822,342 | 9/1931 | Ehrlich | 310/91 |
| 2,317,922 | 4/1943 | Lear | 310/91 |
| 3,432,705 | 3/1969 | Lindtveit | 248/2 |
| 3,516,627 | 6/1970 | Gable et al. | 248/15 |

*Primary Examiner*—Harold Broome
*Attorney, Agent, or Firm*—William Anthony Drucker

[57] ABSTRACT

A bell housing, for the assembly together of electric motors and driven items, e.g., pumps, comprises a tubular body with a first co-axial flange at one end for mounting a motor, and a second co-axial flange at the other end for mounting a driven item, the first flange including a plurality of sets of holes, the holes of each set being arranged at the same radius from the common central axis of the flange and the body, the radius of each set being different from the radius of each other set, whereby the same bell housing may be used for mounting motors having flanges of at least two different sizes.

3 Claims, 6 Drawing Figures

BELL HOUSINGS FOR MOUNTING ELECTRIC MOTORS

This invention relates to bell housings, as used in the mechanical engineering art for the assembly together of electric motors and items which they serve to drive, for example liquid pumps.

Such bell housings conventionally comprise a first mounting flange at one end for the mounting of the electric motor, an intermediate body portion which may serve as a plain bearing for a driven shaft or which may enclose, with clearance, means for coupling the motor shaft to a driven shaft, and a second mounting flange at the other end of the intermediate body portion for the mounting of the unit to be driven.

Electric motors are commonly supplied complete with a face flange at one end suitable for bolting to means for mounting the motor. Electric motors vary greatly as to the width of their mounting flanges. In order to avoid having a different size of mounting flange for every size of motor, the width of the flanges has tended to become somewhat standardised in commerce so that a large flange and a small flange may serve for a number of different sizes of motor. Hitherto, it has been customary to provide an individually suited bell housing having its first mounting flange appropriately dimensioned for the large-flanged or small-flanged motor as the case may be. This has led to unnecessary prolixity of bell housings, which is clearly inefficient and costly in production.

It is accordingly the object of the present invention to provide an improved construction of bell housing, for the purpose described, which can be utilised for mounting motor flanges of different sizes without modification, thereby reducing manufacturing costs and storage requirements, and facilitating the work of the assembler.

According to the present invention a bell housing comprises a tubular body portion having first and second ends, a first co-axial mounting flange at said first end of the tubular body portion, said first mounting flange including a plurality of sets of holes, to receive bolts for securing a motor flange thereon, the holes of each set being arranged at the same radius from the central common axis of the first mounting flange and the tubular body, the radius of each set being different from the radius of the or each other set, and a second co-axial mounting flange at said second end of the body portion. For example, the first mounting flange may have two sets of holes, the holes of the first set being arranged at a larger radius for receiving bolts to secure the larger flange of a larger-sized motor, and the holes of the second set being arranged at a lesser radius for receiving bolts to secure the smaller flange of a smaller-sized motor.

In a preferred arrangement, the centres of the holes of each set are disposed on the same two lines intersecting at right angles on the central axis of the flange.

In order to accommodate the most closely-arranged set of holes, i.e., those disposed at the shortest radius from the axis of the housing, the intermediate body portion of the housing advantageously has co-axial inner and outer cylindrical surfaces, and preferably only the minimum amount greater in diameter than the shaft bore that is consistent with adequate strength of the housing. For fluid tight sealing of the mounting flange of a motor to the first mounting flange of the housing, the latter preferably has its major face, remote from the tubular body portion, with co-axial circumferentially-extending recessing to receive packing material.

In order to further strengthen the housing, it may comprise reinforcing webs joining to the first and second mounting flanges and to the tubular body portion, said webs being disposed at angularly spaced positions about the central axis, and angularly between holes.

In a first embodiment, said webs are arranged as pairs which are diametrically opposed on respective lines intersecting at right angles on the central axis. In another embodiment, the webs are arranged as two spaced parallel pairs which are symmetrically diametrically opposed.

The second mounting flange may conveniently be ractangular and have four holes, or may be substantially oval-shaped and have two holes.

In order that the nature of the invention may be readily ascertained, two embodiments of bell housing in accordance therewith are hereinafter particularly described with reference to the figures of the accompanying drawings, wherein.

Figure 1:
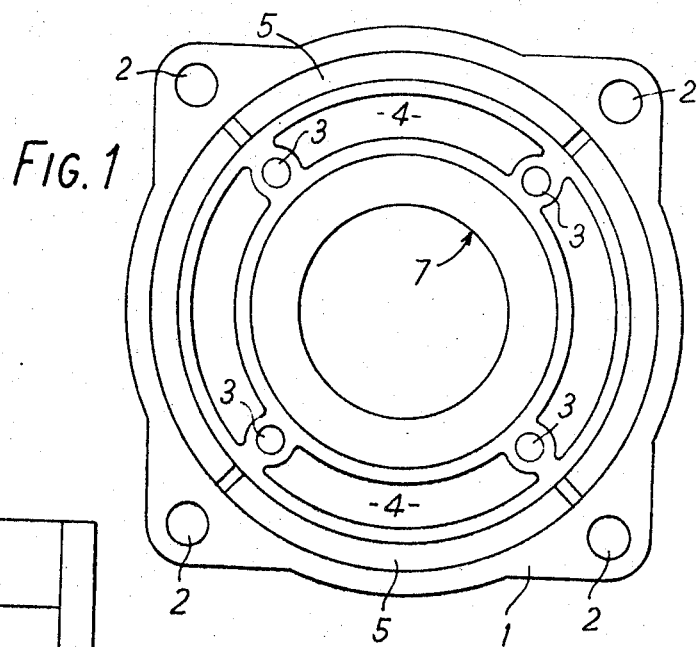
FIG. 1 is an elevation of a first embodiment of bell housing, viewed from the end of the first mounting flange for motor attachment.
Figure 2:
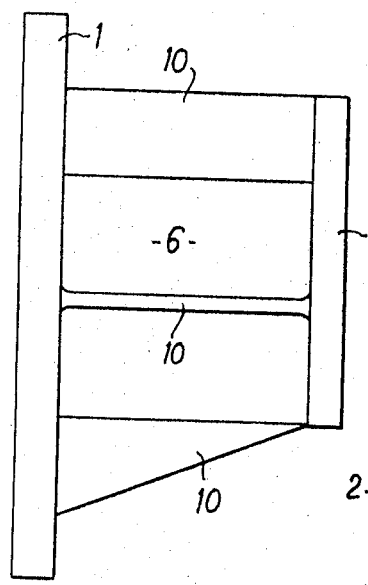
FIG. 2 is a side elevation thereof.
Figure 3:
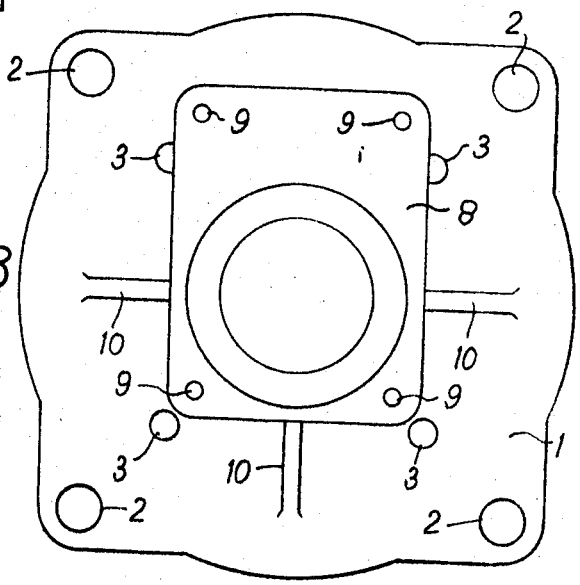
FIG. 3 is an elevation viewed from the end of the second mounting flange for the attachment of a driven unit.

Referring to FIGS. 1 to 3, the bell housing comprises a first mounting flange 1 of approximately square outline and having in it a first set of holes 2, 2, 2, 2 which are symmetrically arranged at a radius, from the axis of the housing, which corresponds to the bolt holes of a commercially available large-flange electric motor. The flange 1 is also provided with a second set of holes 3, 3, 3, 3 which are disposed symmetrically at a smaller radius which corresponds to the bolt holes of a commercially available small-flange electric motor. The end face of the flange 1 is recessed as at 4, 5.

The housing further comprises an intermediate body portion 6 of generally cylindrical shape and having a cylindrical bore 7. At the other end of the body portion 6 there is provided a second mounting flange 8 which is of generally rectangular outline and which is provided with a set of four holes 9 at positions selected for attachment of a driven unit, e.g., a liquid pump. Running between the first and second flanges, on the outside of the intermediate body portion, there are provided reinforcing webs 10.

Figure 4:
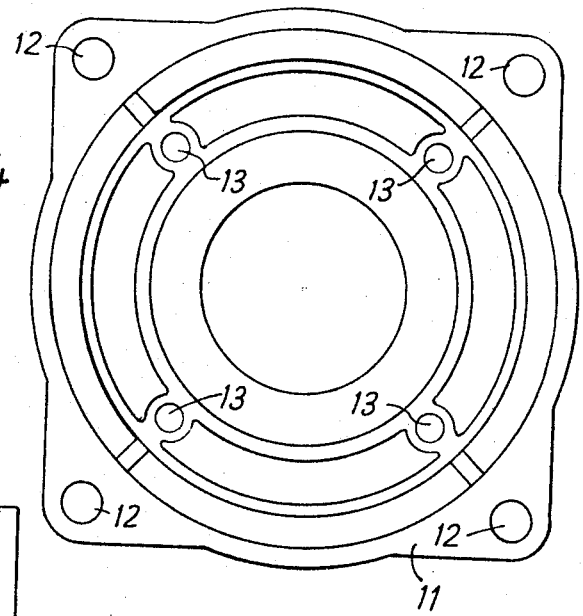
FIG. 4 is an elevation of a embodiment of bell housing, viewed from the end of the first mounting flange for motor attachment.
Figure 5:
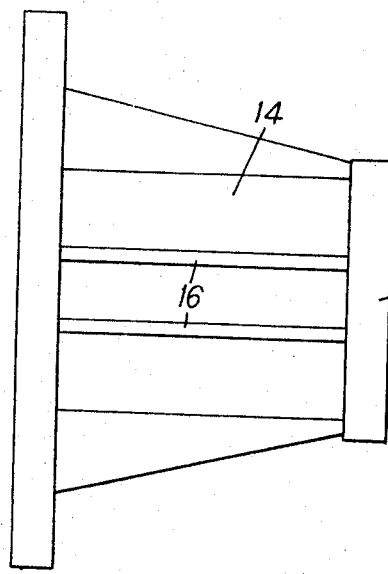
FIG. 5 is a side elevation of a bell housing of FIG. 4.
Figure 6:
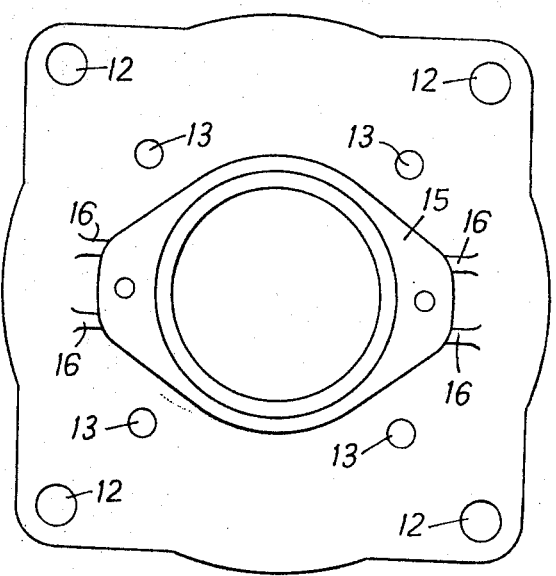
FIG. 6 is an elevation of the bell housing of FIG. 4 viewed from the end of the second mounting flange for the attachment of a driven unit.

Referring now to FIGS. 4 to 6, the second embodiment of bell housing comprises a first mounting flange 11, again of approximately square outline, having in it a first set of holes 12, 12, 12, 12 at a larger radius, and a second set of holes 13, 13, 13, 13 at a smaller radius. The housing further comprises an intermediate body portion 14, at the other end of which there is the second oval mounting flange 15 for mounting of the driven unit. Running between the first and second mounting flanges, on the outside of the intermediate body portion, there are provided two sets of parallel reinforcing webs 16.

The bell housings as a whole may conveniently be made from a synthetic resinous plastics material such as glass-filled nylon. With both embodiments, the same housing may be utilised without modification for the attachment of a small-flanged or a large-flanged electric motor.

We claim:

1. A bell housing, for securing between an electric motor and a structure, comprising an integrally formed one-piece body which includes:
  i. an intermediate tubular portion having first and second ends
  ii. a first coaxial mounting flange portion extending from said first end of said intermediate portion and including a plurality of sets of holes, the holes of each set being arranged at the same radius from the common central axis of the first coaxial mounting flange portion and the intermediate tubular portion, the radius of each set of holes being different from the radius of each other set of holes, thereby to permit the securing to said first coaxial mounting flange portion of electric motors having mounting holes of selectively different corresponding radius
  iii. a second coaxial mounting flange portion extending from said second end of said intermediate portion and including a set of holes for mounting said flange to a structure.

2. A bell housing, as claimed in claim 1, wherein said first coaxial mounting flange portion of said body has a major face remote from said intermediate portion of said body has a major face romote from said intermediate portion of said body, said major face including coaxial axially-extending arcuate recesses to receive packing material.

3. A bell housing, as claimed in claim 1, wherein said integrally moulded one-piece body further includes reinforcing webs joining to said first and second coaxial mounting flange portions and to said intermediate tubular portion, said webs being disposed at angularly spaced positions about the central axis and angularly between holes of said first coaxial mounting flange portion.

* * * * *